(12) United States Patent
Lavery et al.

(10) Patent No.: US 12,547,823 B2
(45) Date of Patent: Feb. 10, 2026

(54) DYNAMICALLY AND SELECTIVELY UPDATED SPREADSHEETS BASED ON KNOWLEDGE MONITORING AND NATURAL LANGUAGE PROCESSING

(71) Applicant: Google LLC, Mountain View, CA (US)

(72) Inventors: Andrew J. Lavery, Austin, TX (US); Earl J. Wagner, Chicago, IL (US); Matthew Albright, Montclair, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/485,056

(22) Filed: Sep. 24, 2021

(65) Prior Publication Data

US 2023/0094877 A1 Mar. 30, 2023

(51) Int. Cl.
*G06F 40/18* (2020.01)
*G06F 16/2452* (2019.01)
*G06N 5/02* (2023.01)

(52) U.S. Cl.
CPC ........ *G06F 40/18* (2020.01); *G06F 16/24522* (2019.01); *G06N 5/02* (2013.01)

(58) Field of Classification Search
CPC .......... G06F 40/18; G06F 16/245; G06N 5/02
USPC ....................................................... 715/220
See application file for complete search history.

(56) References Cited

U.S. PATENT DOCUMENTS

| | | | |
|---|---|---|---|
| 5,926,822 A | 7/1999 | Garman | |
| 7,613,719 B2 | 11/2009 | Chang et al. | |
| 8,972,437 B2 | 3/2015 | Hoellwarth | |
| 9,652,446 B2 | 5/2017 | Creason et al. | |
| 9,870,354 B2 | 1/2018 | Hicks et al. | |
| 10,120,851 B2 | 11/2018 | Naor | |
| 10,180,979 B2 | 1/2019 | Perlegos | |
| 10,698,978 B1 * | 6/2020 | Hatton | G06F 40/279 |
| 10,740,367 B2 | 8/2020 | Taylor et al. | |

(Continued)

FOREIGN PATENT DOCUMENTS

| | | |
|---|---|---|
| CN | 103473234 A | 12/2013 |
| CN | 105531706 A | 4/2016 |

(Continued)

OTHER PUBLICATIONS

Microsoft, "Refresh an external data connection in Excel", https://support.microsoft.com/en-us/office/refresh-an-external-data-connection-in-excel-1524175f-777a-48fc-8fc7-c8514b984440#:~:text=Click%20a%20cell%20in%20the,minutes%20between%20each%20refresh%20operation, Jun. 2, 2021, 4 pages.

(Continued)

*Primary Examiner* — Stephen S Hong
*Assistant Examiner* — Tionna M Burke
(74) *Attorney, Agent, or Firm* — Lowenstein Sandler LLP

(57) ABSTRACT

A method includes identifying, by a processing device, a document having a tabular structure including cells. The document is associated with a set of update controls for automatically updating content in at least one cell of the cells. The method further includes detecting, by the processing device and based on the set of update controls, an event triggering an automated update of the content in the at least one cell, and responsive to detecting the event, obtaining, by the processing device, data from at least one external data source in accordance with the set of update controls, and causing, by the processing device, the content in the at least one cell to be updated based on the data from the at least one external data source.

14 Claims, 6 Drawing Sheets

(56) References Cited

U.S. PATENT DOCUMENTS

| | | | |
|---|---|---|---|
| 10,936,688 | B2 | 3/2021 | Lu et al. |
| 11,182,538 | B2 | 11/2021 | Ben-Ishay |
| 11,222,171 | B2 | 1/2022 | Zhang |
| 11,550,778 | B2 | 1/2023 | Zarras |
| 2012/0173476 | A1 | 7/2012 | Rizvi |
| 2013/0159832 | A1* | 6/2013 | Ingargiola ............... G06F 40/18 715/220 |
| 2015/0019216 | A1* | 1/2015 | Singh ...................... G06F 40/18 704/235 |
| 2015/0261794 | A1* | 9/2015 | Lehrian ................... G06F 40/18 707/807 |
| 2015/0310073 | A1 | 10/2015 | Chakrabarti et al. |
| 2016/0110367 | A1 | 4/2016 | Krishnan |
| 2016/0179940 | A1 | 6/2016 | Ashtiani |
| 2017/0060868 | A1* | 3/2017 | Rais Ghasem ....... G06F 16/243 |
| 2017/0308571 | A1 | 10/2017 | Mccurley |
| 2017/0337233 | A1 | 11/2017 | Fawcett |
| 2018/0108092 | A1 | 4/2018 | Goodyear |
| 2018/0203924 | A1 | 7/2018 | Agrawal |
| 2018/0239748 | A1 | 8/2018 | Zhang |
| 2018/0349377 | A1* | 12/2018 | Verma .................... G06N 3/045 |
| 2019/0012305 | A1 | 1/2019 | Dvorak |
| 2019/0340240 | A1 | 11/2019 | Duta |
| 2020/0097541 | A1 | 3/2020 | Christianson et al. |
| 2020/0117758 | A1 | 4/2020 | Lu et al. |
| 2021/0042308 | A1 | 2/2021 | Mustafi |
| 2021/0081405 | A1 | 3/2021 | Zarras |
| 2021/0103694 | A1 | 4/2021 | Bouton |
| 2021/0141820 | A1 | 5/2021 | Vora |
| 2021/0173829 | A1 | 6/2021 | Zeng |
| 2021/0200761 | A1 | 7/2021 | Li |
| 2021/0271697 | A1 | 9/2021 | Agrawal |
| 2022/0035802 | A1 | 2/2022 | Penzo et al. |
| 2022/0044134 | A1 | 2/2022 | Joy |
| 2022/0058191 | A1 | 2/2022 | Chen |
| 2022/0067281 | A1 | 3/2022 | Hu |
| 2022/0309106 | A1 | 9/2022 | Ramos et al. |
| 2022/0335943 | A1 | 10/2022 | Zhao |

FOREIGN PATENT DOCUMENTS

| | | |
|---|---|---|
| CN | 105824872 A | 8/2016 |
| CN | 108628887 A | 10/2018 |
| CN | 109829085 A | 5/2019 |
| CN | 110705226 A | 1/2020 |
| CN | 112417836 A | 2/2021 |
| CN | 118159960 A | 6/2024 |
| CN | 112800773 B | 6/2025 |
| JP | H11212996 A | 8/1999 |
| JP | 2003228564 A | 8/2003 |
| JP | 2007328716 A | 12/2007 |
| JP | 2012123559 A | 6/2012 |
| JP | 2019109782 A | 7/2019 |
| JP | 2021501386 A | 1/2021 |
| WO | 2015009586 A2 | 1/2015 |
| WO | 2021134358 A1 | 7/2021 |

OTHER PUBLICATIONS

Vyasa, Synapse, "Novel Deep Learning Powered Text Analytics", https://vyasa.com/solutions/synapse/, Jun. 2, 2021, 13 pages.
Microsoft, "Data refresh in Power BI", https://docs.microsoft.com/en-us/power-bi/connect-data/refresh-data, Jun. 3, 2021, 31 pages.
USPTO, Office Action for U.S. Appl. No. 17/485,028, mailed Jul. 15, 2022.
USPTO, Office Action for U.S. Appl. No. 17/485,008, mailed Jul. 8, 2022.
USPTO, Advisory Action for U.S. Appl. No. 17/485,028, mailed Mar. 3, 2023.
USPTO, Advisory Action for U.S. Appl. No. 17/485,008, mailed Mar. 7, 2023.
USPTO, Office Action for U.S. Appl. No. 17/485,028, mailed Aug. 24, 2023.
USPTO, Office Action for U.S. Appl. No. 17/485,008, mailed Aug. 24, 2023.
USPTO, Final Office Action for U.S. Appl. No. 17/485,028, mailed Dec. 13, 2022.
USPTO, Final Office Action for U.S. Appl. No. 17/485,008, mailed Dec. 13, 2022.
PCT Notification of Transmittal of the International Search Report and the Written Opinion of the International Searching Authority for PCT Application No. PCT/US2022/044614, mailed Dec. 8, 2022, 13 pages.
PCT Notification of Transmittal of the International Search Report and the Written Opinion of the International Searching Authority for PCT Application No. PCT/US2022/044613, mailed Dec. 15, 2022, 17 pages.
Xia Siyuan S9XIA@Uwaterloo Ca et al: "KTabulator: Interactive Ad hoc Table Creation using Knowledge Graphs", Proceedings of the 36th Annual ACM Symposium on Applied Computing, ACMPUB27, New York, NY, USA, May 6, 2021 (May 6, 2021), pp. 1-14, XP058739515, DOI: 10.1145/3411764.3445227 ISBN: 978-1-4503-8128-4 abstract figure 1.
PCT Notification of Transmittal of the International Search Report and the Written Opinion of the International Searching Authority for PCT Application No. PCT/US2022/044611, mailed Jan. 17, 2023, 11 pages.
Notice of Allowance for Korean Patent Application No. 10-2024-7012704, mailed May 30, 2025, 4 Pages.
Office Action for Chinese Patent Application No. 202280071445.1, mailed Apr. 12, 2025, 12 Pages.
Office Action for Chinese Patent Application No. 202280071445.1, mailed Nov. 30, 2024, 20 Pages.
Office Action for Chinese Patent Application No. 202280071451.7, mailed Dec. 5, 2024, 15 Pages.
Office Action for Indian Patent Application No. 202447031700, mailed Jul. 3, 2025, 06 Pages.
Office Action for Indian Patent Application No. 202447031718, mailed Jul. 3, 2025, 07 Pages.
Office Action for Indian Patent Application No. 202447031738, mailed Jul. 3, 2025, 08 Pages.
Office Action for Japanese Patent Application No. 2024518729, mailed Feb. 25, 2025, 3 Pages.
Office Action for Japanese Patent Application No. JP2024518729, mailed Jun. 17, 2025, 06 Pages.
Office Action for Korean Patent Application No. 10-2024-7012705, mailed Jul. 22, 2024, 15 Pages.
Office Action for Korean Patent Application No. 20247012705, mailed Jan. 23, 2025, 4 Pages.
Office Action of European Patent Application No. 22792996.5, mailed Mar. 7, 2025, 03 Pages.

* cited by examiner

| | A | B | C | D | E | F | G | H | I |
|---|---|---|---|---|---|---|---|---|---|
| | Book name | Author | Published 1st Edition Date | Newest Edition Date | Sales Ranking | Sales 2019 | Sales 2020 | Sales 2021 | Sales 2019-2021 |
| 1 | ABC | John Doe | 230-1 | 240-1 | 250-1 | 260-1 | 270-1 | 280-1 | 290-1 |
| 2 | XYZ | Jane Doe | 230-2 | 240-2 | 250-2 | 260-2 | 270-2 | 280-2 | 290-2 |

FIG. 2

| | A | B | C | D | E | F | G | H | I |
|---|---|---|---|---|---|---|---|---|---|
| | | | Static 310-1 | Yearly 310-2 | Daily 310-3  Weekly 320 | Static 310-4 | Static 310-5 | Weekly 310-6 | |
| 1 | Book name | Author | Published 1st Edition Date | Newest Edition Date | Sales Ranking | Sales 2019 | Sales 2020 | Sales 2021 | Sales 2019-2021 |
| 2 | ABC | John Doe | 10/20/2015 | 11/21/2017 | 29,422 | 157,924 | 55,209 | 11,057 | =SUM(F2:H2) |
| 3 | XYZ | Jane Doe | 9/2/2010 | 9/2/2010 | 53,200 | 20,111 | 28,491 | 7,494 | =SUM(F3:H3) |

FIG. 3

DYNAMICALLY AND SELECTIVELY UPDATED SPREADSHEETS BASED ON KNOWLEDGE MONITORING AND NATURAL LANGUAGE PROCESSING

TECHNICAL FIELD

Aspects and implementations of the present disclosure relate generally to updating electronic documents, and more particularly relate to dynamically and selectively updating electronic documents having a tabular structure based on knowledge monitoring and natural language processing.

BACKGROUND

An electronic document ("document") can have a tabular structure including a plurality of cells. Such a document can be referred to as a "data table," or simply "table." Each cell corresponds to a region for inputting data in a particular form (e.g. numerical or text data), and the document can be used to organize, analyze and/or store the input data. Each cell can include a non-numerical data entry, a mathematical expression for assigning a value to the cell, or can remain empty. A mathematical expression can include a numerical value, a reference to a value of one or more cells within the spreadsheet, an arithmetic operator, a relational operator, a function, etc. Additionally, the document can support programming capability. For example, content of a cell can be derived from content of one or more other cells of the document. In some implementations, the document can be a spreadsheet. The cells within the spreadsheet can be arranged as an array including a number of rows and a number of columns, where a particular cell of the spreadsheet can be addressed or referenced with respect to its column location within the table and its row location within the table. In some examples, columns can be represented by letters (e.g., Column A, Column B, . . . ) and rows can be represented by numbers (e.g., Row 1, Row 2, . . . ). For example, a cell located in Column D and Row 5 can be referenced as cell D5.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed. In an implementation, a method includes identifying, by a processing device, a document having a tabular structure including a plurality of cells. The document is associated with a set of update controls for automatically updating content in at least one cell of the plurality of cells. The method further includes detecting, by the processing device and based on the set of update controls, an event triggering an automated update of the content in the at least one cell, and responsive to detecting the event, obtaining, by the processing device, data from at least one external data source in accordance with the set of update controls, and causing, by the processing device, the content in the at least one cell to be updated based on the data from the at least one external data source.

In some implementations, the method further includes generating, by the processing device, at least a portion of the document using one or more natural language queries. Generating at least a portion of the document includes defining the set of update controls.

In some implementations, the method further includes the set of update controls includes an update frequency corresponding to an amount of time between updates of the content maintained in the at least one cell. Obtaining the data from the at least one external data source further includes determining that the amount of time has elapsed from a most recent update to the content maintained in the at least one cell, and in response to determining that the amount of time has elapsed from the most recent update, retrieving the data from the at least one external data source. For example, the update frequency can be a default update frequency corresponding to a recommended update frequency. As another example, the method can further include providing, by the processing device, a user interface presenting a default update frequency in association with the at least one cell, receiving, by the processing device, user input specifying a user-defined update frequency for the at least one cell, where the user input causes the user interface to be modified to present the user-defined update frequency in association with the at least one cell, and modifying, by the processing device, the set of update controls stored in a data store to include the user-defined update frequency for the at least one cell.

In some implementations, obtaining the data from the at least one external data source further comprises receiving the data from a subscriber associated with a portion of the at least one external data source.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2 is a diagram illustrating an example spreadsheet including a number of cells, in accordance with implementations of the present disclosure.

FIG. 3 is a diagram illustrating an example spreadsheet including a number of cells updated in accordance with respective update frequencies, in accordance with implementations of the disclosure.

DETAILED DESCRIPTION

Figure 1:
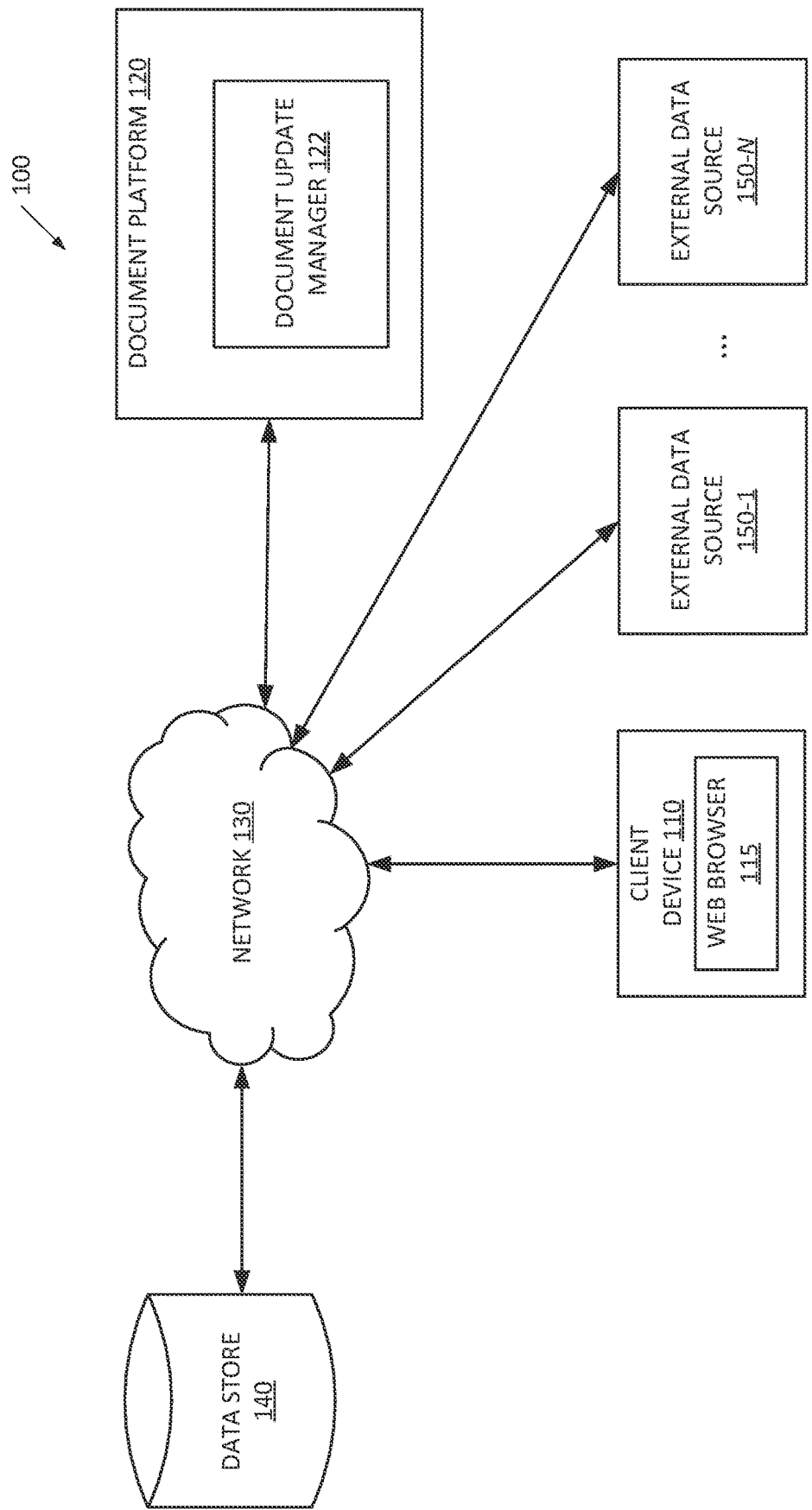
FIG. 1 illustrates an example system architecture, in accordance with implementations of the present disclosure.

Aspects of the present disclosure relate to dynamically and selectively updated spreadsheets based on knowledge monitoring and natural language processing. One challenge in constructing an electronic document ("document") having a tabular structure (e.g., spreadsheet) is populating data into the document. As an illustration, the following portion of a spreadsheet including Columns A-I and Rows 1-3 is provided as Table 1:

TABLE 1

| | A | B | C | D | E | F | G | H | I |
|---|---|---|---|---|---|---|---|---|---|
| | | | Published | Newest | Sales | Sales | Sales | Sales | Sales |
| 1 | Book name | Author | 1$^{st}$ Edition Date | Edition Date | Ranking | 2019 | 2020 | 2021 | 2019-2021 |
| 2 | ABC | John Doe | | | | | | | |
| 3 | XYZ | Jane Doe | | | | | | | |

Table 1 is a portion of a spreadsheet that organizes data related to a set of books. The set of books includes "ABC" by John Doe and "XYZ" by Jane Doe, and attributes of each book of the set of books. More specifically, each cell in Column A defines the name of a book, each cell in Column B defines the author of the book defined by the cell of Column A within the same row, each cell in Column C defines the published first edition date for the book defined by the cell of Column A within the same row, each cell in Column D defines the newest edition date for the book defined by the cell of Column A within the same row, each cell in Column E defines a sales ranking for the book defined by the cell of Column A within the same row, each cell in Column F defines a number of sales in 2019 for the book defined by the cell of Column A within the same row, each cell in Column G defines a number of sales in 2020 for the book defined by the cell of Column A within the same row, each cell in Column H defines a number of sales in 2021 for the book defined by the cell of Column A within the same row, and each cell in Column I defines a number of sales from 2019 to 2021 for the book defined by the cell of Column A within the same row. The values for a cell of Column I can be derived from the corresponding values of the cells from columns F-H within the same row. For example, the value of cell 12 can be derived as a summation of the values of cell F2 through cell H2.

Columns A and B can be manually entered into the spreadsheet by a user via a computing device. Column I derives its value from Columns F-H, so the cells of Column I can be automatically populated with data once data is entered into Columns F-H. Although data like published first edition date in Column C, number of sales from 2019 in column F, and number of sales from 2020 in Column G may correspond to fixed or static values, data like newest edition date in Column D, sales ranking in Column E, and number of sales from 2021 in Column H may correspond to dynamic values that change over time. For example, the number of sales from 2021 can be updated daily, and can even be updated on a more granular setting (e.g., on an hourly basis).

Although conventional spreadsheets enable the use of mathematical expressions to derive cell values internally with reference to other cell values (as described above), conventional spreadsheets typically require users to manually update cell values as these values change over time. Manually updating cells of a spreadsheet can result in incorrect values in some of the cells due to human errors and can take significant time and computing resources.

Aspects of the present disclosure address the above and other deficiencies by dynamically and selectively updating documents having a tabular structure (e.g., spreadsheets) based on knowledge monitoring and natural language processing. Natural language processing can refer to processing of natural language in order to enable interactions between humans and computing devices. For example, natural language processing techniques can be used to convert a natural language query having an unstructured natural language format that is not understandable by a computing device, into a query having a structured format that is understandable by the computing device to perform a natural language processing task. The natural language query can be a textual query, a voice query, etc. Examples of natural language processing tasks include text and speech processing, morphological analysis, syntactic analysis, lexical semantics, relational semantics, etc.

A document update manager of a computing system can utilize natural language queries to populate one or more cells of a document with data from external data sources (e.g., external databases or repositories, knowledge graphs, websites, etc.). For example, in the case of a spreadsheet, a natural language expression can be defined for a column of the spreadsheet, where a row of the spreadsheet can include one or more cells that provide context information for data in that row. The document update manager can use the content information, in conjunction with natural language queries for other columns of the spreadsheet, to populate the remainder of the row with data. For example, in some implementations, a natural language expression to populate cells within a column of a spreadsheet can be of the form=NLP ("[Natural Language Query String]", [Reference Cell 1 in row M], [Reference Cell 2 in row M], 'Reference Cell N in row M]). Illustratively, in the above example with reference to Table 1, each row contains a book title and author in Columns A-B. Cells in Column C can be populated based on the natural language query "When was the 1$^{st}$ edition published?" The natural language expression can illustratively be of the form=NLP (When was the 1$^{st}$ edition published?", A2, B2).

Knowledge monitoring can refer to monitoring content changes occurring in an external data source. The document update manager can further define a set of update controls for dynamically updating or refreshing content maintained within a document. For example, the document update manager can, with respect to a document having a number of cells at least partially populated with content retrieved from one or more external data sources using one or more natural language queries, dynamically update content maintained in the cells with data obtained from the one or more external data sources. For example, a portion of the document can include a first set of cells that are filled with manually entered data, and the document update manager can automatically update a remaining portion of the document that includes a second set of cells filled with data to be retrieved from an external data source. For example, the data used to fill the second set of cells can correspond to dynamic data that changes over time.

In some implementations, the document update manager updates the document in accordance with a number of update frequencies each corresponding to a respective cell. Examples of update frequencies include hourly, daily, monthly, yearly, etc. For example, the update frequency can correspond to cells of a spreadsheet. Here, an update frequency can be controllable for all rows of cells of a particular column ("column-level control"), for a particular cell ("cell-level control"), for a particular row ("row-level control"), etc. For example, row-level control can be provided in conjunction with column-level control to override a column update frequency defined for each of the cells of the row. Row-level control can be used if, for example, a user prefers to update a particular row of cells more frequently than other rows (regardless of column). Cell-level control can be used if, for example, a user prefers to update a particular cell more frequently than other cells (regardless of column or row).

The update frequency for a cell can be determined based on an analysis of the frequency of change of the data within a corresponding external data source. For example, an analysis can be performed to determine the average amount of time that elapses between consecutive updates of the data within the external data source (e.g., based on a comparison of timestamps between the consecutive updates, by maintaining an audit log of updates occurring in the external data source, by analyzing a search engine history to obtain an estimate of the rate of update when an external data source is a website, etc.). As an illustration, if the data to be updated is the Newest Edition Date for book "ABC," if it is determined that a new edition of "ABC" is added in the external data source every year, then the update frequency can be set to one year. In some implementations, the update frequency can be set as a default update frequency on a fixed schedule. A user can have the option of modifying the currently set update frequency to perform more frequent updates or less frequent updates (e.g., change the update frequency from daily to weekly, or change from daily to hourly). Thus, the default update frequency can be provided as a recommendation, and the user has the option of setting a customized update schedule for at least a portion of the data populated within the document. Visual indicators of respective update frequencies can be provided within the document. For example, if an update frequency with respect to cells of a particular column in a spreadsheet is daily, the document update manager can provide a visual indicator of the update frequency for the column that the update frequency is currently set for daily. Accordingly, the document update manager can "pull" data for updating one or more cells from one or more external data sources in accordance with respective fixed update schedules assigned to the one or more cells.

In some instances, such as with respect to data that changes infrequently (e.g., at least monthly), it may be inefficient to perform updates in accordance with a fixed update frequency. To address this, in some implementations, the document update manager can update the document by employing one or more subscribers or listeners attached to an external data source (e.g., a node of a knowledge graph). A subscriber can be attached to at least a portion of an external data source (e.g., a knowledge graph) to identify when the portion of the external data source has been updated, and, upon identifying an update event, forward the updated data to the document update manager for insertion into the corresponding cell. Accordingly, the document update manager can receive data for updating one or more cells that is "pushed" by one or more subscribers attached to one or more respective external data sources.

Automatically updating cell values can eliminate human errors which may result from manual entries, and reduce the time and computing resources needed for the updates. In addition, the use of update controls can further improve computational efficiency and reduce utilization of computing resources. For example, by updating one or more cells in accordance with an update frequency determined based on an analysis of frequency of change, document content updates can be optimized in a manner that reduces unnecessarily frequent updates and thus reduces resource consumption. As another example, by updating one or more cells in accordance with a subscriber or listener, document content updates can only be made for those cells when an update is indicated by the subscriber, and thus reduces resource consumption. Accordingly, automatically updating cells of a spreadsheet using the set of update controls described herein can improve computational efficiency.

The document update manager can provide one or more additional features. Examples of such features include providing access back to an external data source for data exploration, identifying incorrect or partially correct data, implementing a data confidence feature, identifying an intent of a natural language query to leverage unstructured data sources and/or structured data sources, handling multi-dimensional data. For example, assume that a spreadsheet includes a list of cities in the United States. One of the columns of the spreadsheet can be "Population," and a user may be interested in viewing graphs and calculations based on populations in a number of cities. Each cell in the "Population" column can be a single-dimensional value (e.g., latest population) or a multi-dimensional value, identifying data types for data retrieved in response to a natural language query, etc. Further details regarding the operations performed by the document update manager will be described herein below.

FIG. 1 illustrates an example system architecture 100, in accordance with implementations of the present disclosure. The system architecture 100 (also referred to as "system" herein) includes at least one client device 110 that can connect to servers, such as document platform 120 (e.g., server), via a network 130. One client device 110 and one document platform 120 are illustrated as connected to network 130 for simplicity. In practice, there may be more client devices and/or document platforms. Also, in some instances, a client device may perform one or more functions of a document platform and a document platform may perform one or more functions of a client device. Client device 110 may access or receive information from document platform 120. The system architecture 100 can represent a cloud-based environment, which can enable communication between server(s) hosting document platform 120 and client devices 110 over the network 130 to store and share electronic documents. Alternatively, the system architecture 100 can apply to systems that are locally interconnected. Further, although some aspects of the disclosure are described with reference to spreadsheets and document applications managing spreadsheets, it should be understood to those skilled in the art that the systems, methods, functions, and embodiments of the present disclosure can apply to any type of electronic documents and any type of programs or services offered by any type of host applications.

In implementations, network 130 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Client device 110 can include a computing device such as personal computer (PC), laptop, mobile phone, smart phone, tablet computer, netbook computer, network-connected television, etc. The client device 110 can be associated with one or more users, and the client device 110 can also be referred to as a "user device."

In the implementation shown, document platform 120 may interact with client device 110 such that client device 110, in conjunction with document platform 120, can execute an electronic document ("document") application to manage various documents including documents having a tabular structure. For example, the document application can be an online document application. In some implementations, the document application is a spreadsheet application (e.g., online spreadsheet application). Alternatively, the document application can provide functionality described herein without the use of document platform 120. Yet alternatively, document platform 120 can interact with a web browser 115 (rather than a designated document application) to, for example, present documents, receive user input related to the documents, etc.

Documents of a user of the client device 110 may be stored by document platform 120 in, for example, data store 140. Although illustrated as a single device in FIG. 1, document platform 120 may be implemented as, for example, a single computing device or as multiple distributed computing devices. It should be understood and appreciated that whether a device is functioning as a server or a client device can depend on the specific application being implemented. That is, whether a computing device is operating as a client or a server may depend on the context of the role of the computing device within the application. The relationship of client device and server can arise by virtue of program executing on the respective devices and having a client-server relationship to each other.

As discussed above, the interaction of client device 110 with document platform 120 may be implemented through a web browser 115 executed at client device 110. The term "web browser" is intended to refer to any program that allows a user to browse markup documents (e.g., web documents), regardless of whether the browser program is a stand-alone program or an embedded program, such as a browser program included as part of an operating system. In some implementations, the document application, as described herein, is implemented as a distributed web application in which portions of the document application execute at one or more of client device 110 and at document platform 120. More specifically, client device(s) 110 may request the document application from document platform 120. In response, document platform 120 may transmit portions of the document application for local execution at clients 110. The document application may thus execute as a distributed application across document platform 120 and one or more client devices 110. In this manner, client device 110 may not be required to install any document application locally to use the document application hosted by the document platform 120.

In general, functions described in implementations as being performed by the document platform 120 can also be performed on the client device 110 in other implementations, if appropriate. In addition, the functionality attributed to a particular component can be performed by different or multiple components operating together. The document platform 120 can also be accessed as a service provided to other systems or devices through appropriate application programming interfaces.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the document platform 120.

A document, as described herein, may be implemented as a distributed web application in which portions of the application execute at multiple client devices 110 and at the document platform 120 to provide for collaboration among multiple users working on a single document. For example, multiple users may simultaneously or concurrently edit such a collaborative document and view the edits of each of the users in real time or near real time (e.g., within a few milliseconds or seconds). When one user edits the document (e.g., a cell of the document), the edit may be transmitted to the document platform 120 and then forwarded to other collaborating users that are also editing or viewing the spreadsheet. To this end, the document platform 120 may handle conflicts between collaborating users, such as when two users try to simultaneously edit a particular cell. For example, the document platform 120 may accept the first edit received or in some way prioritize the collaborating users such that the edits of higher priority users override those of lower priority users. If an edit of a user is rejected by the document platform 120, the document platform 120 may transmit a message back to the user that informs that user of the rejection of the edit. In this manner, multiple users may collaborate, potentially in real-time (or near real-time), on a single spreadsheet. In some implementations, the parties that view and collaborate on a particular document may be specified by an initial creator of the document. For example, the initial creator of the document may be given "administrator" privileges that allow the creator to specify the privileges for each of the other possible collaborators. The initial creator may specify that the other collaborators have privileges to do one or more of the following: edit the spreadsheet, view the spreadsheet only, edit designated parts of the spreadsheet, or add additional users to the list of possible collaborators. For example, certain users may be able to edit certain parts of the spreadsheet, while other designated cells or regions of cells will remain "locked" to those users such that the users can view but not edit the locked cells. The initial creator may also be able to configure and/or allow at least some collaborators to configure a set of update controls for dynamically updating or refreshing content maintained within the spreadsheet. In some implementations, a document may be designated as a "public" document that anyone can view and/or edit.

As further shown, the document platform 120 may include a document update manager 122 to manage document updates. The document update manager 122 can utilize natural language queries to populate one or more cells of a document having a tabular structure with data from one or more external data sources 150-1 through 150-N. In the case that the document includes a spreadsheet, a natural language expression can be defined for a column of the spreadsheet, where a row of the spreadsheet can include one or more cells that provide context information for data in that row. The document update manager 122 can use the content information, in conjunction with any other natural language queries provided for other columns of the spreadsheet, to populate the remainder of the row with data.

In some implementations, at least one of the external data sources 150-1 through 150-N includes a knowledge graph. A knowledge graph is a graph-structured data model that provides a comprehensive collection of structured data about a network of entities (e.g. objects, events, concepts), as well as relationships between each of the entities, and attributes or properties about each of the entities. A knowledge graph can include a number of nodes that correspond to respective entities, and a number of edges that each define a relationship between a pair of nodes (entities). A knowledge graph can be embodied as an undirected graph, or directed graph that defines one-way relationships or links between the nodes. A knowledge graph can use a reasoning mechanism to derive new knowledge. The data within a knowledge graph can range from static or near static (e.g., the title of a book, the author of a book, the published first edition date of a book), to dynamic (e.g., sales ranking of the book, the number of sales of the book in a current year). Since a knowledge graph is updated over time, audit logs of the changes for data within the knowledge graph can be maintained. Such audit logs can include timestamps or other metadata that can be used to identify the update frequency with respect to a particular type of data. The knowledge graph can be a general knowledge graph, personal knowledge graph, a cohort knowledge graph based on a group of one or more individuals, etc.

As another example, the external data source can be a website. For example, for entities that are not yet in a knowledge graph, a search engine can be used to locate an external data source for the data. Certain websites can be static or near-static with infrequent updates, while other websites can be dynamic with frequent updates. To estimate the frequency of change corresponding to a particular website, a web site search history (e.g., search engine history) can be used to estimate the frequency of change for the web site data source.

The document update manager 122 can dynamically and selectively update or refresh data populated within the document. For example, the document update manager 122 can, with respect to a document at least partially populated with data retrieved using one or more natural language queries, dynamically update one or more cells with data obtained from one or more external data sources. For example, a portion of the document can include a first set of cells (e.g., cells) filled with manually entered data, and the document update manager 122 can automatically update a remaining portion of the document that includes a second set of cells filled with data to be retrieved from an external data source. For example, the data used to fill the second set of cells can correspond to dynamic data that changes over time. In some implementations, the document update manager 122 can perform an update for at least one cell at an update frequency (e.g. hourly, daily, monthly, yearly). For example, the update frequency can correspond to cells of a spreadsheet. Here, an update frequency can be controllable for all rows of cells of a particular column ("column-level control"), for a particular cell ("cell-level control"), for a particular row ("row-level control"), etc. For example, row-level control can be provided in conjunction with column-level control to override a column update frequency defined for each of the cells of the row.

To populate and/or update data within a document in accordance with the implementations described herein, the document update manager 122 can receive, from a user, a natural language query defined within the document (e.g., defined by a column of a spreadsheet). The document update manager 122 can implement a query conversion mechanism to convert the natural language query into a data access query for accessing data from an external data source to fill in cells of the column (e.g., cells within each row corresponding to the column of the spreadsheet). For example, the query conversion mechanism can leverage semantic relationships within the natural language query to translate the natural language string into a machine-readable string for accessing the data from the external data source. Once translated, the document update manager 122 can utilize the data access query to import data into the cells, and determine an update frequency for the data imported into the cell.

In some implementations, the document update manager 122 updates the document in accordance with a number of update frequencies each corresponding to a respective cell. The update frequency for a cell can be based on an analysis of the frequency of change of the data. The frequency of change of the data can be obtained from audit logs corresponding to the external data source. For example, an analysis can be performed to determine the amount of time that elapses between consecutive changes or updates to the data within the external data source (e.g., based on a comparison of timestamps of audit logs between the consecutive updates).

The update frequency can then be determined in view of a pattern of updates with respect to a given set of samples of amounts of time between consecutive updates. For example, if a particular data item is determined to change at a substantially regular or fixed frequency in view of the given set of samples, the update frequency can be set to that frequency. As another example, it may be the case that a particular data item is determined to change at various frequencies (e.g., an irregular schedule). For example, the amount of time that elapses between a first update and a second update can be 1 day, but the amount of time that elapses between the second update and a third update can be 1 week. To account for this, the update frequency can be set as the minimum amount of time determined within the given set of samples, an average amount of time determined within the given set of samples, etc. Greater accuracy in update frequency calculation can be achieved by having a greater number of samples within the given set of samples.

In some implementations, the update frequency can be set as a default update frequency on a fixed schedule, which can be modified by a user. The user can have the option of modifying the current update frequency to perform more frequent updates or less frequent updates (e.g., change the update frequency from daily to weekly, or change from daily to hourly). Thus, the default update frequency can be provided as a recommendation, and the user has the option of setting a customized update schedule for at least a portion of the data populated within the document. At least one update frequency for at least one cell can be updated from time-to-time, either automatically or by user request, to ensure that the update frequency is optimally set. For example, it may be the case that a data item that has historically been changing annually is now changing monthly.

Visual indicators of respective update frequencies can be provided within the document. For example, if an update frequency with respect to cells of a particular column in a spreadsheet is daily, the document update manager 122 can provide a visual indicator of the update frequency for the column that the update frequency is currently set for daily. Accordingly, the document update manager 122 can "pull" data for updating one or more cells from one or more external data sources in accordance with respective fixed update schedules assigned to the one or more cells.

As described above, the document update manager 122 can poll an external data source for data updates in accordance with an update frequency. In some instances, such as with respect to data that changes infrequently (e.g., at least monthly), it may be inefficient to perform updates in accordance with an update frequency. To address this, in some implementations, the document update manager 122 can update the document by employing one or more subscribers or listeners associated with an external data source (e.g., a node of a knowledge graph) to subscribe to (e.g., to receive or to be notified of) update events (e.g., using service-to-service communications between a service managing a knowledge graph and the document update manager 122). A subscriber can be associated with (e.g., attached to) at least a portion of an external data source (e.g., a knowledge graph) to identify when the portion of the external data source has been updated, and forward the updated data to the document update manager for insertion into the corresponding cell. Accordingly, the document update manager 122 can receive data for updating one or more cells that is "pushed" by one or more subscribers associated with one or more respective external data sources.

The document update manager 122 can provide one or more additional features. In some implementations, the document update manager 122 can further provide access back to an external data source (e.g., a link to the external data source). This can enable a user to explore more details of the data that has been populated into the document, and provide a way for the user to validate data trust. For example, if the user is concerned about the accuracy of the data from the external data source, the user could access the external data source itself (e.g., via the provided link) to determine whether to trust the veracity of the data.

In some implementations, the document update manager 122 can further identify data populated in a cell that is incorrect or partially correct. This can be true even if the data was statically entered into the cell by the user. The document update manager 122 can then send a notification to the user of a proposed change to the data and/or automatically update the data. Illustratively, with reference to Table 1 above, if the document update manager determines (e.g., by comparing content of a cell with respective content of an external data source) that book "ABC" has a co-author named John Smith, the document update manager 122 can send a notification to the user of the proposal to update cell B2 with "John Doe and John Smith" and/or can automatically update cell B2 with "John Doe and John Smith."

In some implementations, the document update manager 122 can further implement a data confidence feature. For example, the data confidence feature can be related to the confidence that the data obtained from a particular source accurately responds to a particular natural language query. The data confidence feature can utilize a visual confidence indicator for data, such as a confidence percentage, a symbol (e.g., color) corresponding to a confidence range (e.g., green circle for greater than 90% confidence, red circle for less than 50% confidence), etc. A user can set a customizable confidence threshold that should be exceeded in order to populate the corresponding cell with the data. For example, for some natural language queries, a user may want to ensure that only high-confidence data is used (e.g., by setting the confidence threshold for 90% confidence), while for some other natural language queries, a user may have greater tolerance for low-confidence data (e.g., by not setting a confidence threshold).

In some implementations, the document update manager 122 can further identify an intent of a natural language query to leverage unstructured data sources and/or structured data sources. For example, with respect to a spreadsheet, the document update manager can combine a column (e.g., Date of book publication) along with one or more context values (e.g., Book ABC, Author John Doe) to identify the intent of the natural language query.

In some implementations, the document update manager 122 can handle multi-dimensional data. For example, assume that a document is a spreadsheet that includes a list of cities in the United States. One of the columns of the spreadsheet can be "Population," and a user may be interested in viewing graphs and calculations built based on populations in a number of cities. Each cell in the "Population" column can be a single-dimensional value (e.g., latest population) or a multi-dimensional value (e.g., an array of population over time, such as the population from each census measurement). Since the data is populated programmatically into respective cells, the document update manager 122 can retrieve time series population data for graphing and/or calculations.

In some implementations, the document update manager 122 can identify data types for data retrieved in response to a natural language query. For example, data can have a particular data type, such as GPS coordinate, date, single integer value, array of integer values, etc. The document update manager 122 can maintain metadata about the data type that can be used to aid in data manipulation (e.g., creations of graphs, calculations).

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 2 is a diagram illustrating an example spreadsheet 200 having a number of cells, in accordance with implementations of the present disclosure. It is assumed that at least a portion of the cells of the spreadsheet 200 has been populated within data using a document update manager (e.g., the document update manager 122 of FIG. 1). Although a spreadsheet is shown in FIG. 2, such an example should not be considered limiting, and any suitable document having a tabular structure is contemplated.

As shown, the spreadsheet 200 includes a number of columns 210A through 210I and a number of rows 220-1 through 220-3. Although 9 columns and 3 rows are shown, the number of columns and rows should not be considered limiting. Row 220-1 is a descriptive row that indicates the type of data to be inserted within the cell of a corresponding column. For example, the text "Book name" is entered into the cell having an address defined by row 220-1 and column 210A to indicate that the data maintained in the other cells of column 210A correspond to book names (e.g., the respective cells having addresses defined by column 210A and rows 220-2 and 220-3). For example, the cell having an address defined by row 220-2 and column 210A is filled with the book name "ABC" and the cell having an address defined by row 220-3 and column 210A is filled with the book name "XYZ." Accordingly, column 210A is defined as a "Book name" column and includes a number of cells having values indicative of respective book names, and column 210B is defined as an "Author" column and includes a number of cells having values indicative of respective authors for respective ones of the book names within column 210A.

Moreover, column 210C is defined as a "Published 1$^{st}$ Edition Date" column and includes a number of cells (e.g., cells 230-1 and 230-2) having values indicative of respective 1$^{st}$ edition publication dates for respective ones of the book names within column 210A, column 210D is defined as a "Newest Edition Date" column and includes a number of cells (e.g., cells 240-1 and 240-2) having values indicative of respective newest edition dates for respective ones of the book names within column 210A, column 210E is defined as a "Sales Ranking" column and includes a number of cells (e.g., cells 250-1 and 250-2) having values indicative of respective sales rankings for respective ones of the book names within column 210A, column 210F is defined as a "Sales 2019" column and includes a number of cells (e.g., cells 260-1 and 260-2) having values indicative of respective number of sales in the year 2019 for respective ones of the book names within column 210A, column 210G is defined as a "Sales 2020" column and includes a number of cells (e.g., cells 270-1 and 270-2) having values indicative of respective number of sales in the year 2020 for respective ones of the book names within column 210A, column 210H is defined as a "Sales 2021" column and includes a number of cells (e.g., cells 280-1 and 280-2) having values indicative of respective number of sales in the year 2021 for respective ones of the book names within column 210A, and column 210I is defined as a "Sales 2019-2021" column and includes a number of cells (e.g., cells 290-1 and 290-2) having values indicative of respective number of total sales for the years 2019 through 2021 for respective ones of the book names within column 210A. Cells 230 through 290 are presently empty, as data has yet to be propagated within these particular cells. The cell 290-1 can be defined as a sum of the values entered into the cells 270-1 and 280-1, and the cell 290-2 can be defined as the sum of the values entered into the cells 270-2 and 280-2. Further details regarding updating the spreadsheet 200, including the cells 230 through 290, will now be described below with reference to FIG. 3.

FIG. 3 is a diagram illustrating an example spreadsheet 300 having a number of cells, in accordance with implementations of the disclosure. It is assumed that at least a portion of the cells of the spreadsheet 300 has been populated using a document update manager (e.g., the document update manager 122 of FIG. 1.) The spreadsheet 300 is based on the spreadsheet 200 of FIG. 2, and includes columns 210A through 210I and rows 220-1 through 220-3.

The cells 230-290 of the spreadsheet 200 of FIG. 2 have been filled with data. Additionally, each of the columns 210C through 210H have been assigned default update frequencies 310-1 through 310-6 that correspond to recommendations or suggestions for updating the cells within their respective columns. As shown, the default update frequency 310-1 defines column 210C as a static column in which the cells of the column 210C are not updated by recommendation, the default update frequency 310-2 defines column 210D as a yearly update column in which the cells of the column 210D are updated yearly by recommendation, the default update frequency 310-3 defines column 210E as a daily update column in which the cells of column 210E are updated daily by recommendation, the default update frequency 310-4 defines column 210f as a static column in which the cells of column 210F are not updated by recommendation, the default update frequency 310-5 defines column 210G as a static column in which the cells of column 210G are not updated by recommendation, and the default update frequency 310-6 defines column 210H as a weekly update column in which the cells of column 210H are updated weekly by recommendation. The values of the cells of column 210I are defined as a summation of the values of the cells from columns 210F through 210H within the same row (e.g., using the SUM( ) function). Thus, in this example, there is an implicit weekly update frequency of the cells of column 210I by virtue of the currently set weekly update frequency assigned to column 210H. Further details regarding determining default update frequencies are described above with reference to FIG. 1 and below with reference to FIGS. 4-5.

In this example, the default update frequencies 310-1, 310-2, 310-4, 310-5 and 310-6 are defined as currently set update frequencies for their respective columns. That is, the user has accepted these default update frequency recommendations. However, a user can provide a user-defined update frequency that overrides a currently set update frequency and/or default update frequency recommendation if the user would prefer a longer or shorter duration between updates as provided by the default update frequency. In this example, a user-defined update frequency 320 is provided as the currently set update frequency for column 210E. The user-defined update frequency 320 defines column 210D as a weekly update column in which the cells of columns, in contrast to the daily update recommended by the default update frequency 310-3.

Each of the update frequencies 310-1 through 310-6 and 320 can be provided as a visual indicator within the spreadsheet 300. These visual indicators provide a visual interface for a user to analyze the recommended or default update frequencies and/or the currently set update frequencies (e.g., a recommended update frequency such as 310-1 or a user-defined update frequency such as 320) to determine whether the user would like to modify the currently set update frequencies 310-1 through 310-6.

In this illustrative example, the spreadsheet 300 is shown as being updated in accordance with respective update frequencies. However, such an example should not be considered limiting. For example, as described herein above with reference to FIG. 1 and as will be described in further detail below with reference to FIGS. 4-5, the spreadsheet 300 can be updated by utilizing one or more subscribers associated with one or more external data sources that each detect a data update at its corresponding external data source, and push the data update to the document update manager for updating.

Figure 4:
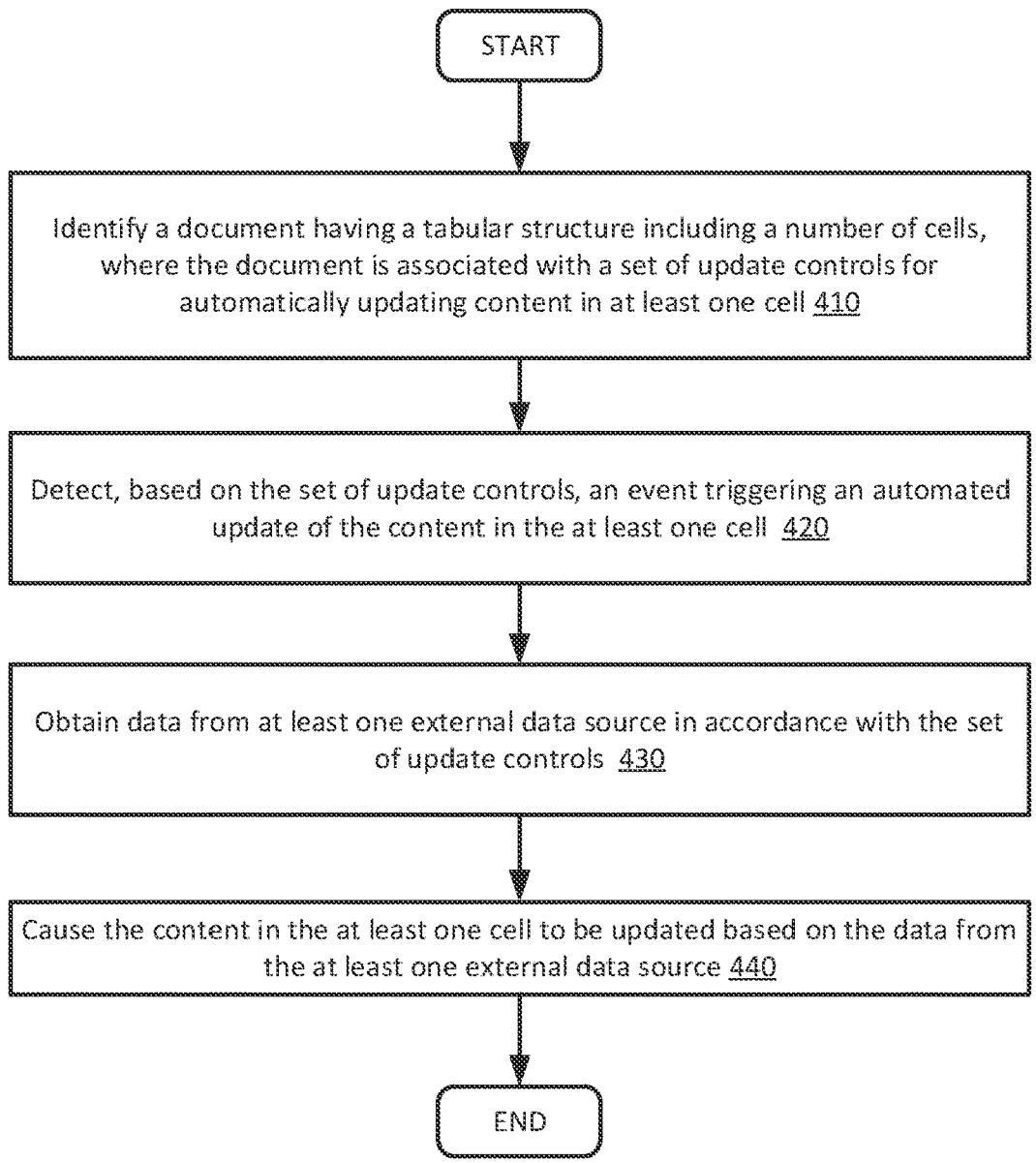
FIG. 4 depicts a flow diagram of a method for dynamically and selectively updating a document based on knowledge monitoring and natural language processing, in accordance with implementations of the present disclosure.

FIG. 4 depicts a flow diagram of a method 400 for dynamically and selectively updating a document based on knowledge monitoring and natural language processing, in accordance with implementations of the present disclosure. Method 400 may be performed by processing logic that may include hardware (circuitry, dedicated logic, etc.), software (e.g., instructions run on a processing device), or a combination thereof. In one implementation, some or all the operations of method 400 may be performed by the document update manager 122 of FIG. 1.

At block 410, the processing logic identifies a document having a tabular structure including a number of cells, where the document is associated with a set of update controls for automatically updating content in at least one cell. The set of update controls can be stored with the document in association with respective cell(s) (e.g., in data store 140). For example, the document can be a spreadsheet including cells defined by a number of columns and a number of rows. The set of update controls can include one or more update controls for updating respective cells of the document. For example, if the document is a spreadsheet, each update control can be a column-level update control for updating a column of cells, a row-level update control for updating a row of cells, or a cell-level update control for updating an individual cell.

In some implementations, the set of update controls includes an update frequency corresponding to at least one cell. The processing logic can obtain the data for updating the at least one cell by "pulling" the data from at least one external data source in accordance with the update frequency. Further details regarding update frequencies are described above with reference to FIGS. 1-3 and with reference to FIG. 5A. In some implementations, providing default settings for the update controls includes implementing at least one subscriber or listener associated with at least one external data source (e.g., a knowledge graph). The processing logic can obtain data for the at least one cell by receiving data "pushed" by at least one subscriber upon identification of an update event with respect to the portion of the external data source. Further details regarding subscribers are described above with reference to FIGS. 1-3 and below with reference to FIG. 5B.

In some implementations, identifying the document includes generating at least a portion of the document using one or more natural language queries. Generating at least a portion of the document can include defining the set of update controls. For example, defining the set of update controls can include determining an update frequency corresponding to at least one cell. As another example, defining the set of update controls can include associating at least one subscriber with at least one external data source.

At block 420, the processing logic detects, based on the set of update controls, an event triggering an automated update of the content in the at least one cell. In some implementations, the event is a detection that an amount of time that has elapsed since a previous update of the content in the at least one cell is equal to an update frequency for updating the content of the at least one cell. In some implementations, the event is the receipt of an update notification from a subscriber attached to a node of a knowledge graph for updating the content of the at least one cell.

At block 430, the processing logic obtains data from at least one external data source in accordance with the set of update controls and, at block 440, the processing logic causes the content in the at least one cell to be updated based on the data from the at least one external data source (e.g., by performing the update of the content in the at least one cell or by providing the data from the external data source to a corresponding client device application that is designated to perform the update). Further details regarding blocks 410-440 are described above with reference to FIGS. 1-4 and below with reference to FIGS. 5A-5B.

Figure 5A:
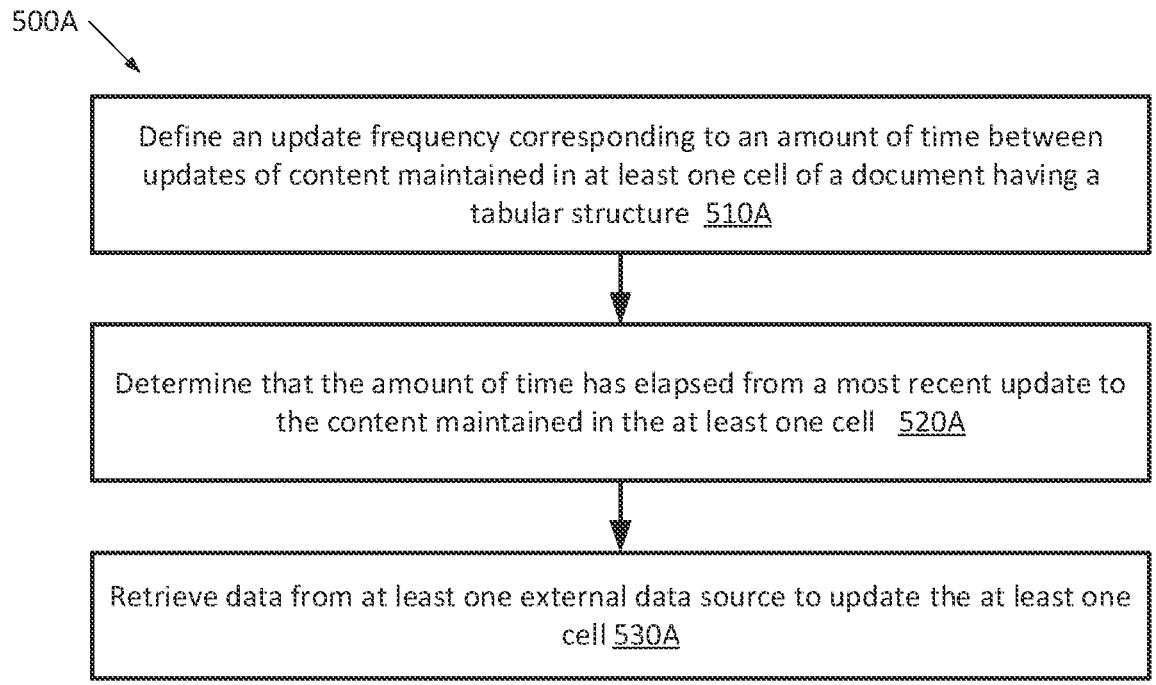
FIGS. 5A and 5B depict flow diagrams of methods for dynamically updating content maintained in a document, in accordance with implementations of the present disclosure.

FIG. 5A depicts a flow diagram of a method 500A for dynamically updating content maintained in a document. Method 500A may be performed by processing logic that may include hardware (circuitry, dedicated logic, etc.), software (e.g., instructions run on a processing device), or a combination thereof. In one implementation, some or all the operations of method 500A may be performed by the document update manager 122 of FIG. 1.

At block 510A, the processing logic defines an update frequency corresponding to an amount of time between updates of content maintained in at least one cell of a document having a tabular structure. For example, the document can be a spreadsheet. In some implementations, the update frequency is a default update frequency corresponding to an update frequency recommendation. In some implementations, the update frequency is a user-defined update frequency that overrides the update frequency recommendation.

In some implementations, a user interface is provided to present the default update frequency in association with the at least one cell. Upon receiving user input specifying the user-defined update frequency for the at least one cell, the user interface can be modified to present the user-defined update frequency in association with the at least one cell. In addition, the set of update controls stored in a data store can be modified to include the user-defined update frequency for the at least one cell.

In some implementations, the update frequency is a column-level update control for controlling the update of data maintained in cells within a particular column of the spreadsheet. In some implementations, the update frequency is a row-level update control for controlling the update of data maintained in cells within a particular row of the spreadsheet. In some implementations, the update frequency is a cell-level update control for controlling the update of data maintained in one or more individual cells of the spreadsheet.

At block 520A, the processing logic determines that the amount of time has elapsed from a most recent update to the content maintained in the at least one cell and, at block 530A, the processing logic retrieves data from at least one external data source to update the at least one cell. The data retrieval can be implemented by programming the document with a natural language query that specifies the at least one external data source (e.g., knowledge graph, web page). The processing logic can utilize a query conversion mechanism to convert the natural language query into a data access query for accessing data from the at least one external data source to fill in the at least one cell. For example, the query conversion mechanism can leverage semantic relationships within the natural language query to translate the natural language string into a machine-readable string for accessing the data from the at least one external data source.

The update frequency for a cell can be based on an analysis of the frequency of change of the data to the amount of time as an average amount of time that elapses between consecutive updates of the data within the external data source (e.g., based on a comparison of timestamps between the consecutive updates). For example, if the external data source is a knowledge graph, audit logs of the changes for data within the knowledge graph can be maintained. Such audit logs can include timestamps or other metadata that can be used to identify the update frequency with respect to a particular type of data. As another example, if the external data source is a website, a website search history (e.g., search engine history) can be used to estimate the frequency of change for the website. Further details regarding blocks 510A through 530A are described above with reference to FIGS. 1-4.

Figure 5B:
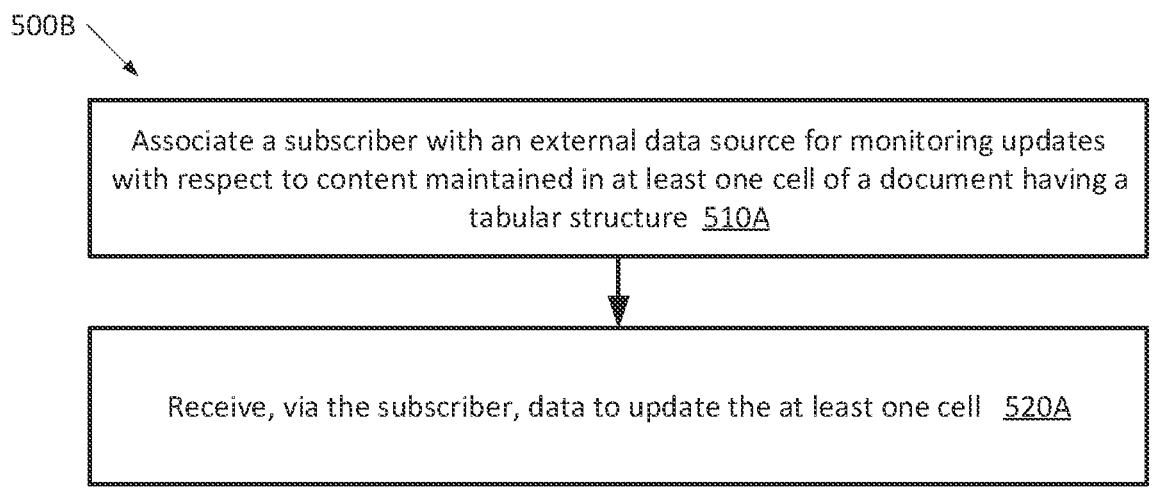

FIG. 5B depicts a flow diagram of a method 500B for dynamically updating content maintained in a document, in accordance with implementations of the present disclosure. Method 500B may be performed by processing logic that may include hardware (circuitry, dedicated logic, etc.), software (e.g., instructions run on a processing device), or a combination thereof. In one implementation, some or all the operations of method 500A may be performed by the document update manager 122 of FIG. 1.

At block 510B, the processing logic associates a subscriber with an external data source for monitoring updates with respect to content maintained in at least one cell of a document having a tabular structure. In some implementations, the document is a spreadsheet. For example, the subscriber can be attached to a knowledge graph to receive updates to the node (e.g., when relevant updates are published by a service managing the knowledge graph).

At block 520B, the processing logic receives, via the subscriber, data to update the at least one cell. For example, upon identifying an update event to the portion of the external data source (e.g., the node of the knowledge graph), the subscriber can provide the updated data that should be inserted into the cell. Further details regarding blocks 510B and 520B are described above with reference to FIGS. 1-4.

Figure 6:
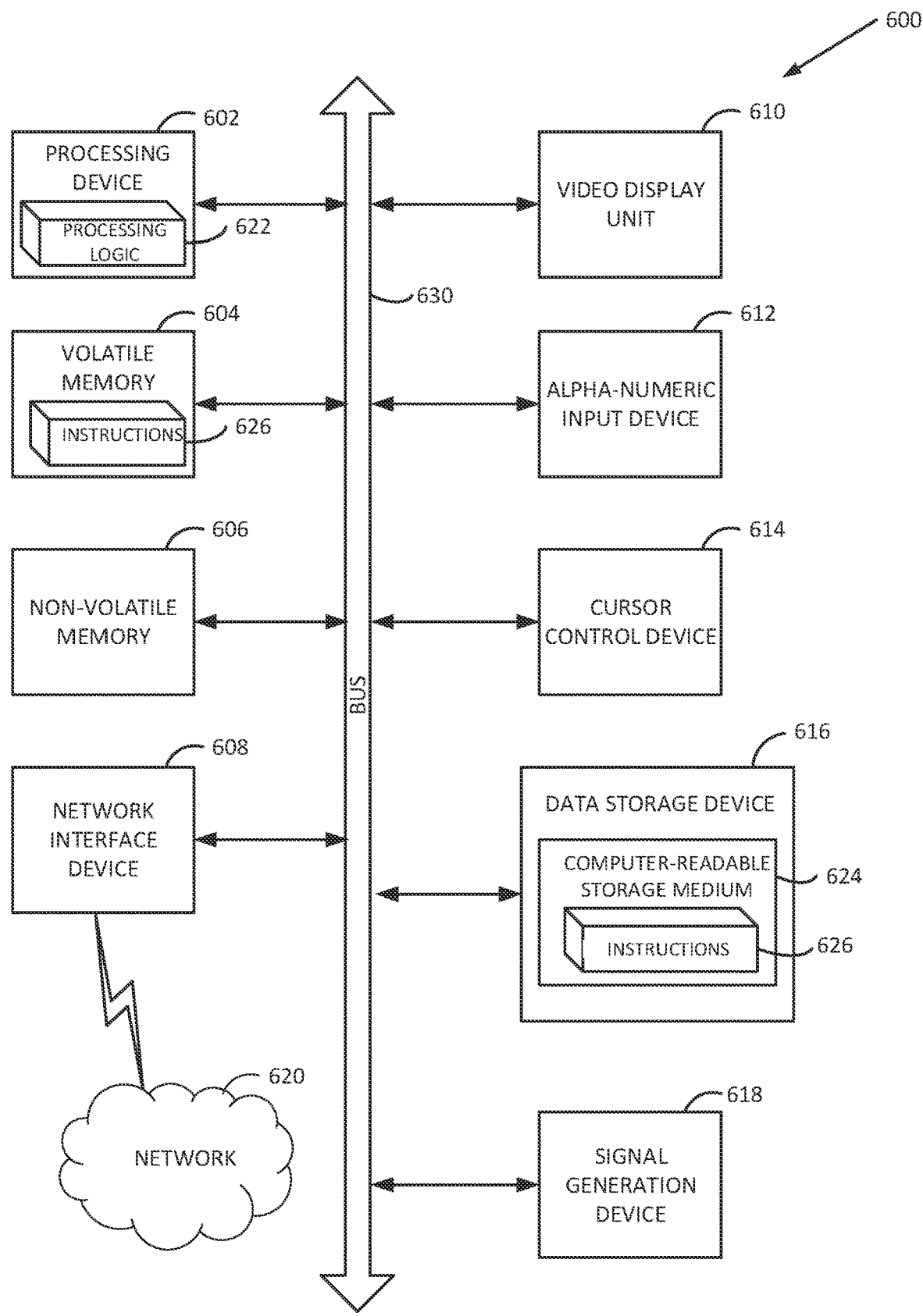
FIG. 6 is a block diagram illustrating an exemplary computer system, in accordance with implementations of the present disclosure.

FIG. 6 is a block diagram illustrating an exemplary computer system, in accordance with implementations of the present disclosure. The computer system 600 can be the document platform 130 or the client device 110 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 640.

Processor (processing device) 602 represents one or more general-purpose processing devices such as a microprocessor, central processing unit, or the like. More particularly, the processor 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 can also be one or more special-purpose processing devices such as an application specific integrated circuit (ASIC), a field programmable gate array (FPGA), a digital signal processor (DSP), network processor, or the like. The processor 602 is configured to execute instructions 605 (e.g., for predicting channel lineup viewership) for performing the operations discussed herein.

The computer system 600 can further include a network interface device 608. The computer system 600 also can include a video display unit 610 (e.g., a liquid crystal display (LCD) or a cathode ray tube (CRT)), an input device 612 (e.g., a keyboard, and alphanumeric keyboard, a motion sensing input device, touch screen), a cursor control device 614 (e.g., a mouse), and a signal generation device 620 (e.g., a speaker).

The data storage device 618 can include a non-transitory machine-readable storage medium 624 (also computer-readable storage medium) on which is stored one or more sets of instructions 605 (e.g., for obtaining optimized encoder parameter settings) embodying any one or more of the methodologies or functions described herein. The instructions can also reside, completely or at least partially, within the main memory 604 and/or within the processor 602 during execution thereof by the computer system 600, the main memory 604 and the processor 602 also constituting machine-readable storage media. The instructions can further be transmitted or received over a network 630 via the network interface device 608.

In one implementation, the instructions 605 include instructions for designating a verbal statement as a polling question. While the computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:
generating, by a processing device and based on one or more natural language queries and one or more contextual items defined within a document, at least a portion of the document having a tabular structure comprising a plurality of cells arranged in a plurality of columns and a plurality of rows, wherein a natural language query of the one or more natural language queries is associated with at least one column of the plurality of columns, wherein a contextual item of the one or more contextual items comprises at least one row header of at least one row of the plurality of rows, wherein generating at least the portion of the document based on the one or more natural language queries and the one or more contextual items comprises defining a set of update controls for automatically updating content in at least one cell of the plurality of cells using at least one external data source comprising a knowledge graph, and wherein defining the set of update controls comprises determining a recommended update frequency, corresponding to an amount of time between updates of the content in the at least one cell, based on an analysis of at least one frequency of change of data within the at least one external data source;
detecting, by the processing device and based on the set of update controls, an event triggering an automated update of the content in the at least one cell; and
responsive to detecting the event:
obtaining, by the processing device, data from the at least one external data source comprising the knowledge graph in accordance with the set of update controls and based on a respective natural language query of the one or more natural language queries and a respective contextual item comprising respective at least one row header of the at least one cell; and
causing, by the processing device, the content in the at least one cell to be updated based on the data from the at least one external data source comprising the knowledge graph.

2. The method of claim 1, wherein the recommended update frequency is a default update frequency.

3. The method of claim 1, further comprising:
receiving, by the processing device via a user interface, user input specifying a user-defined update frequency for the at least one cell, wherein the user input causes the user interface to be modified to present the user-defined update frequency in association with the at least one cell; and
modifying, by the processing device, the set of update controls to include the user-defined update frequency for the at least one cell.

4. The method of claim 1, wherein obtaining the data from the at least one external data source further comprises:
determining that the amount of time has elapsed from a most recent update to the content maintained in the at least one cell; and
in response to determining that the amount of time has elapsed from the most recent update, retrieving the data from the at least one external data source.

5. The method of claim 1, wherein obtaining the data from the at least one external data source further comprises receiving the data from a subscriber associated with a portion of the at least one external data source.

6. A system comprising:
a memory device; and
a processing device coupled to the memory device, the processing device to perform operations comprising:
generating, based on one or more natural language queries and one or more contextual items defined within a document, at least a portion of the document having a tabular structure comprising a plurality of cells arranged in a plurality of columns and a plurality of rows, wherein a natural language query of the one or more natural language queries is associated with at least one column of the plurality of columns, wherein a contextual item of the one or more contextual items comprises at least one row header of at least one row of the plurality of rows, wherein generating at least the portion of the document based on the one or more natural language queries and the one or more contextual items comprises defining a set of update controls for automatically updating content in at least one cell of the plurality of cells using at least one external data source comprising a knowledge graph, and wherein defining the set of update controls comprises determining a recommended update frequency, corresponding to an amount of time between updates of the content in the at least one cell, based on an analysis of at least one frequency of change of data within the at least one external data source;

detecting, based on the set of update controls, an event triggering an automated update of the content in the at least one cell; and responsive to detecting the event:

obtaining data from the at least one external data source comprising the knowledge graph in accordance with the set of update controls and based on a respective natural language query of the one or more natural language queries and a respective contextual item comprising respective at least one row header of the at least one cell; and causing the content in the at least one cell to be updated based on the data from the at least one external data source comprising the knowledge graph.

7. The system of claim 6, wherein the recommended update frequency is a default update frequency.

8. The system of claim 6, wherein the operations further comprise:

receiving, via a user interface, user input specifying a user-defined update frequency for the at least one cell, wherein the user input causes the user interface to be modified to present the user-defined update frequency in association with the at least one cell; and modifying the set of update controls stored in a data store to include the user-defined update frequency for the at least one cell.

9. The system of claim 6, wherein obtaining the data from the at least one external data source further comprises:

determining that the amount of time has elapsed from a most recent update to the content maintained in the at least one cell; and in response to determining that the amount of time has elapsed from the most recent update, retrieving the data from the at least one external data source.

10. The system of claim 6, wherein obtaining the data from the at least one external data source further comprises receiving the data from a subscriber attached to a portion of the at least one external data source.

11. A non-transitory computer readable storage medium comprising instructions for a server that, when executed by a processing device, cause the processing device to perform operations comprising:

generating, based on one or more natural language queries and one or more contextual items defined within a document, at least a portion of the document having a tabular structure comprising a plurality of cells arranged in a plurality of columns and a plurality of rows, wherein a natural language query of the one or more natural language queries is associated with at least one column of the plurality of columns, wherein a contextual item of the one or more contextual items comprises at least one row header of at least one row of the plurality of rows, wherein generating at least the portion of the document based on the one or more natural language queries and the one or more contextual items comprises defining a set of update controls for automatically updating content in at least one cell of the plurality of cells using at least one external data source comprising a knowledge graph, and wherein defining the set of update controls comprises determining a recommended update frequency, corresponding to an amount of time between updates of the content in the at least one cell, based on an analysis of at least one frequency of change of data within the at least one external data source;

detecting, based on the set of update controls, an event triggering an automated update of the content in the at least one cell; and responsive to detecting the event:

obtaining data from the at least one external data source comprising the knowledge graph in accordance with the set of update controls and based on a respective natural language query of the one or more natural language queries and a respective contextual item comprising respective at least one row header of the at least one cell; and causing the content in the at least one cell to be updated based on the data from the at least one external data source comprising the knowledge graph.

12. The non-transitory computer readable storage medium of claim 11, wherein the recommended update frequency is a default update frequency.

13. The non-transitory computer readable storage medium of claim 11, wherein the operations further comprise:

receiving, via a user interface, user input specifying a user-defined update frequency for the at least one cell, wherein the user input causes the user interface to be modified to present the user-defined update frequency in association with the at least one cell; and modifying the set of update controls stored in a data store to include the user-defined update frequency for the at least one cell.

14. The non-transitory computer readable storage medium of claim 11, wherein obtaining the data from the at least one external data source further comprises receiving the data from a subscriber attached to a portion of the at least one external data source.

* * * * *